Figure 1A:
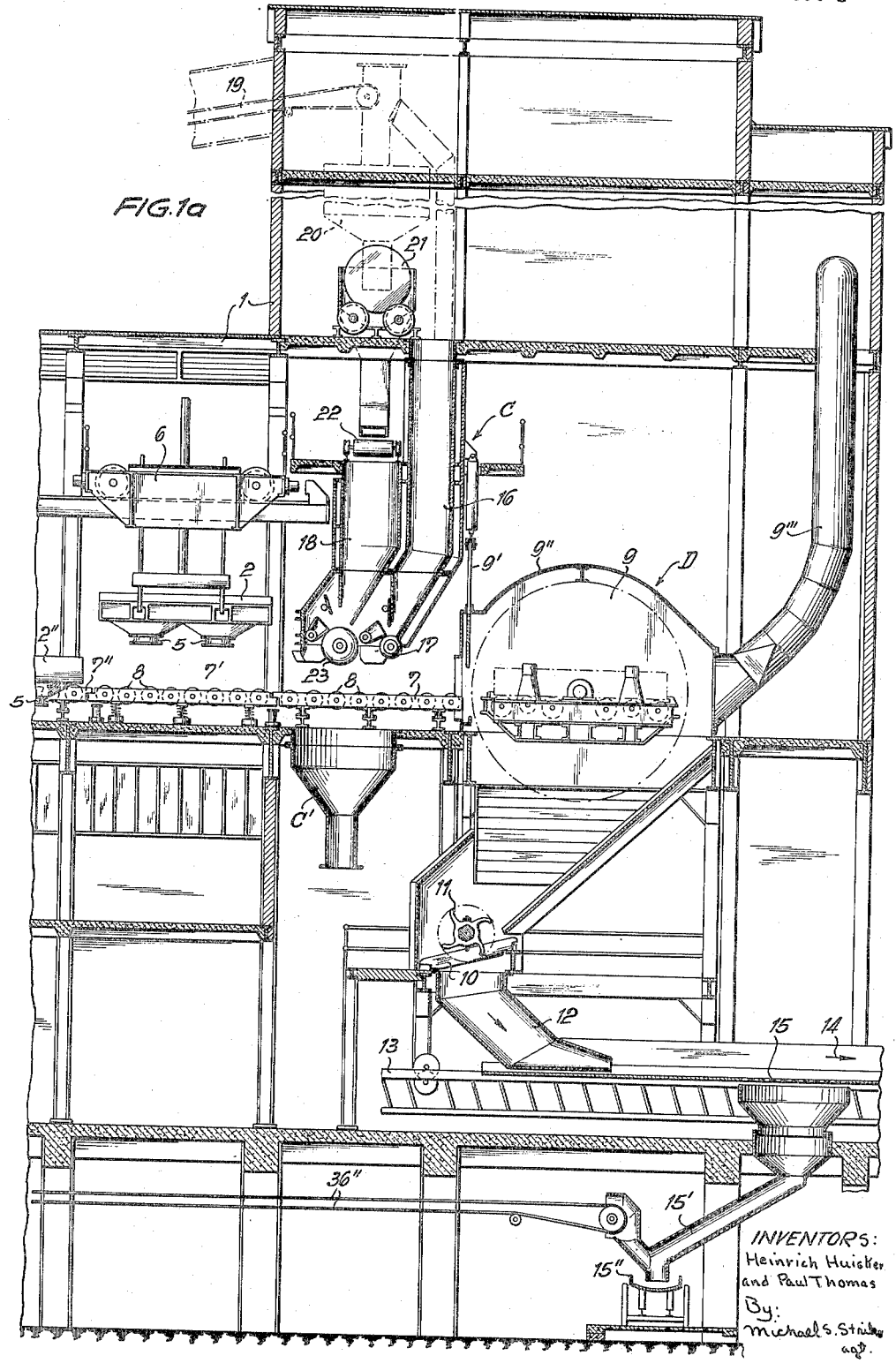

Sept. 18, 1956 H. HUISKEN ET AL 2,763,479
APPARATUS FOR SINTERING ORES AND THE LIKE
Filed March 22, 1955 14 Sheets-Sheet 1

INVENTORS:
Heinrich Huisken
and Paul Thomas
By:
Michael S. Striker
agt.

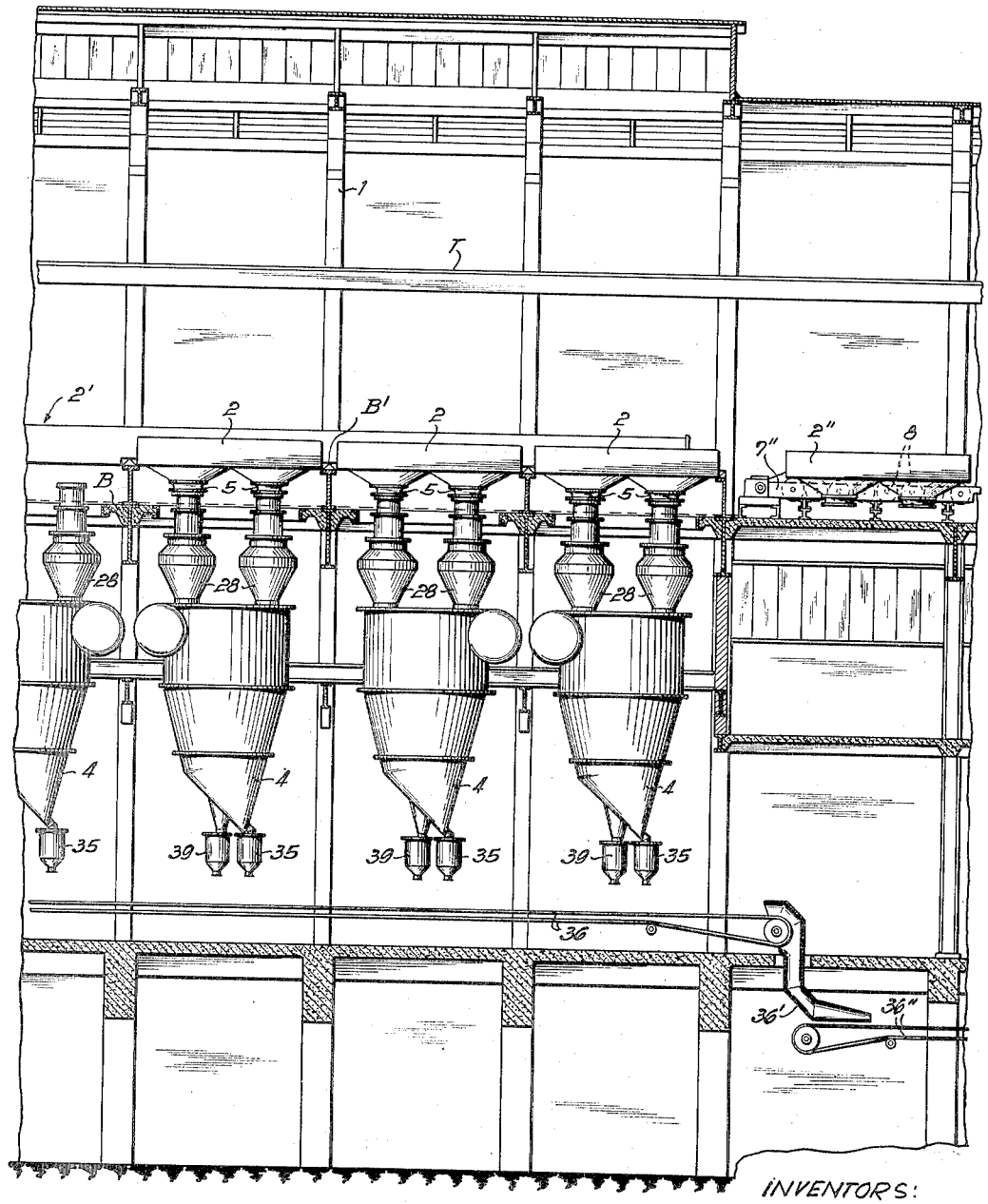

Sept. 18, 1956　　　H. HUISKEN ET AL　　　2,763,479
APPARATUS FOR SINTERING ORES AND THE LIKE
Filed March 22, 1955　　　　　　　　　　　14 Sheets-Sheet 3

INVENTORS:
Heinrich Huisken
and Paul Thomas
By:
Michael S. Striker

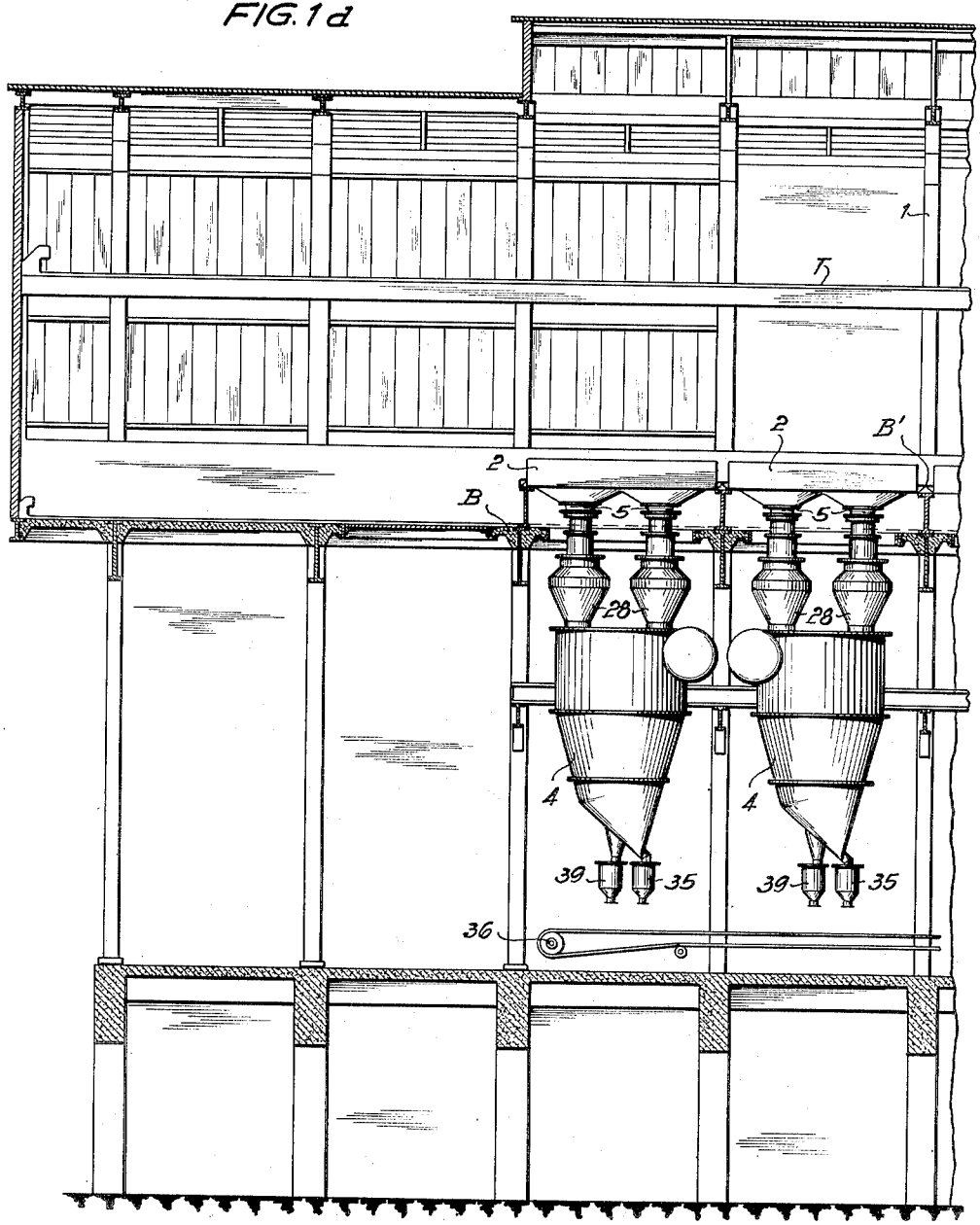

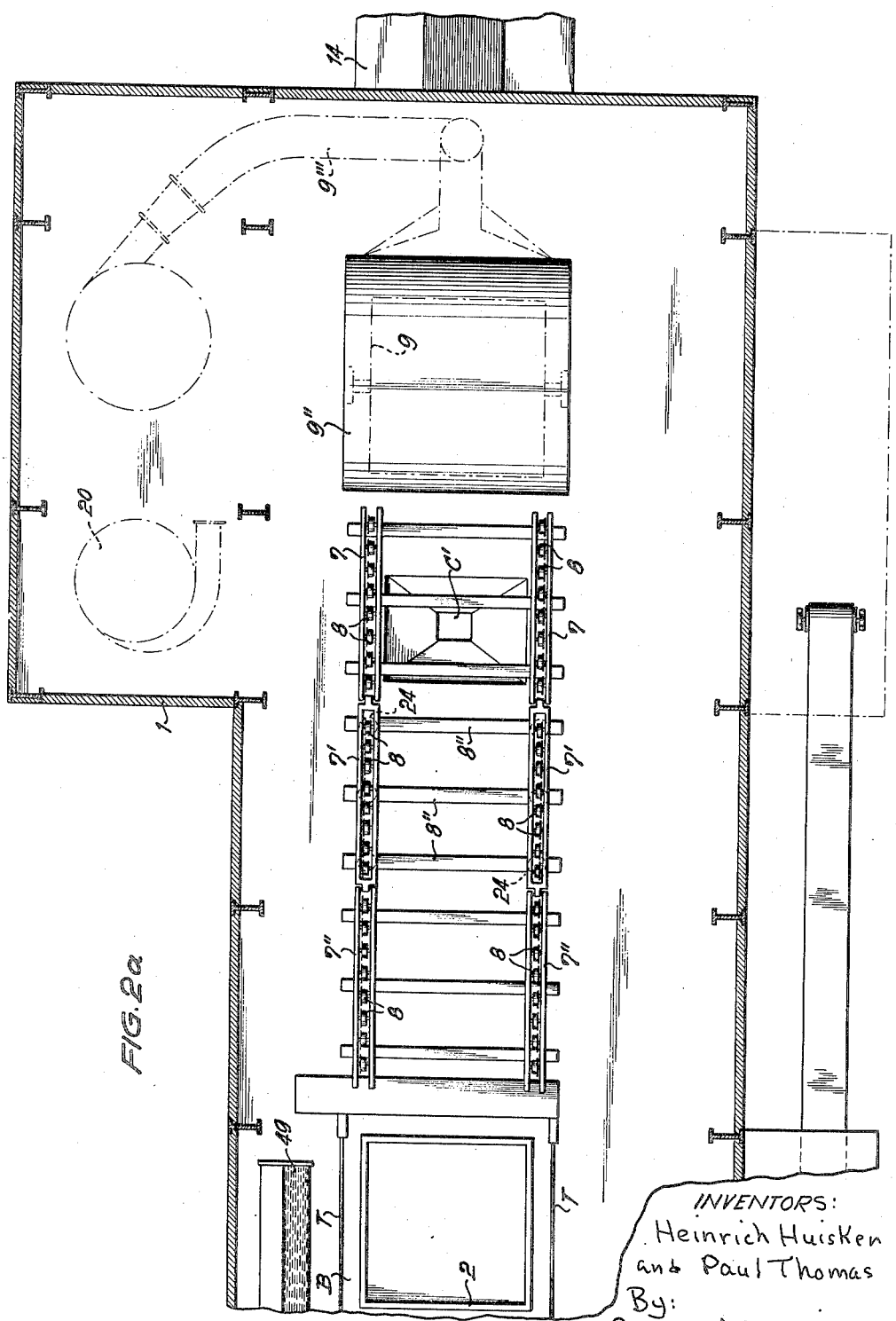

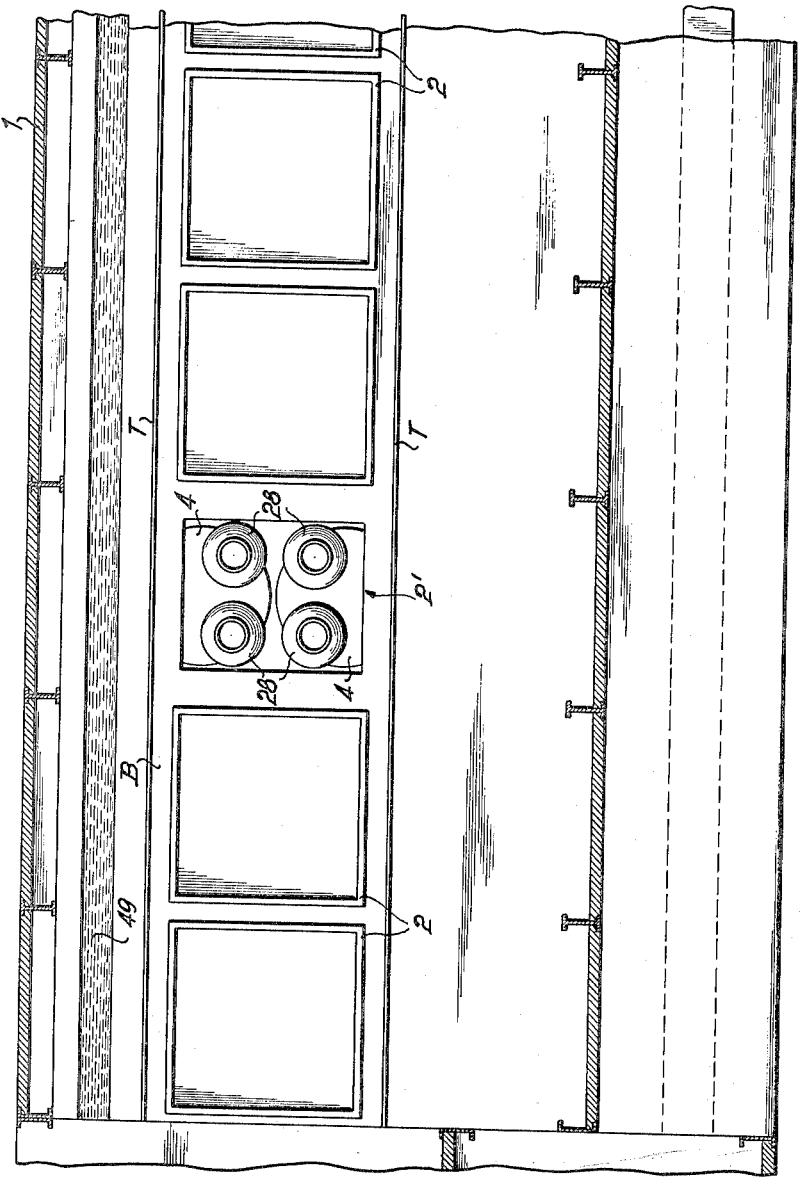

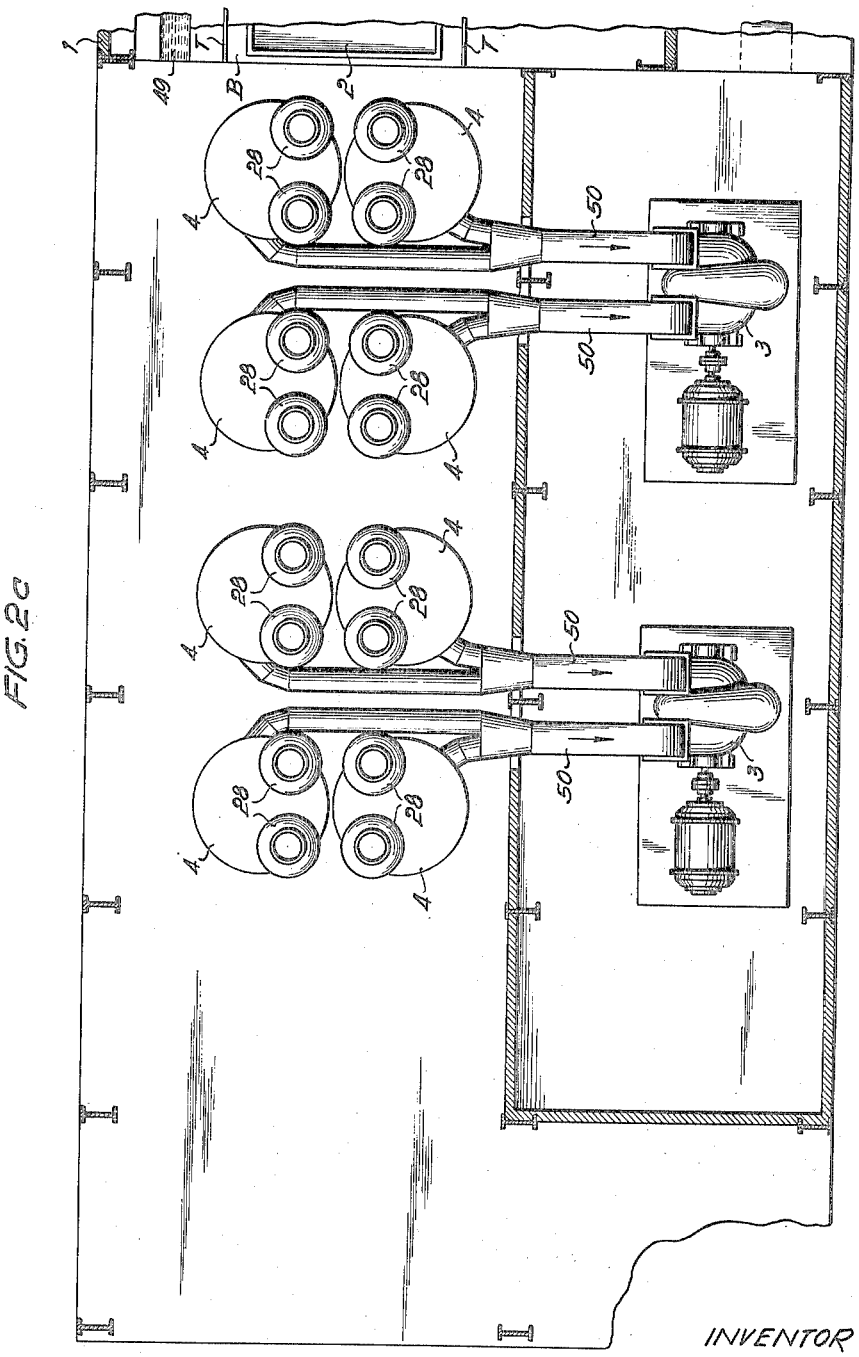

Sept. 18, 1956     H. HUISKEN ET AL     2,763,479
APPARATUS FOR SINTERING ORES AND THE LIKE
Filed March 22, 1955     14 Sheets-Sheet 8

INVENTORS:
Heinrich Huisken
and Paul Thomas
By:
Michael S. Striker
agt.

INVENTORS:
Heinrich Huisken
and Paul Thomas
By:
Michael S. Striker agt.

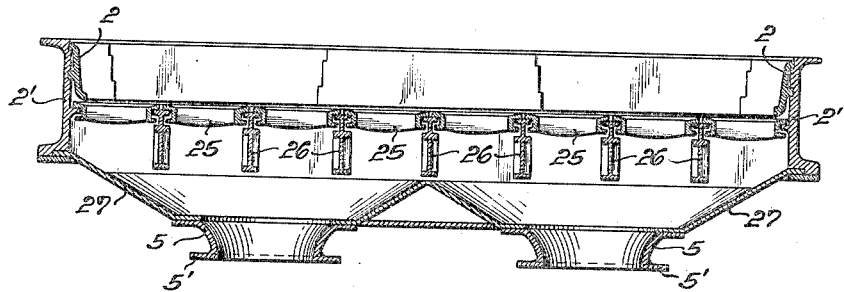
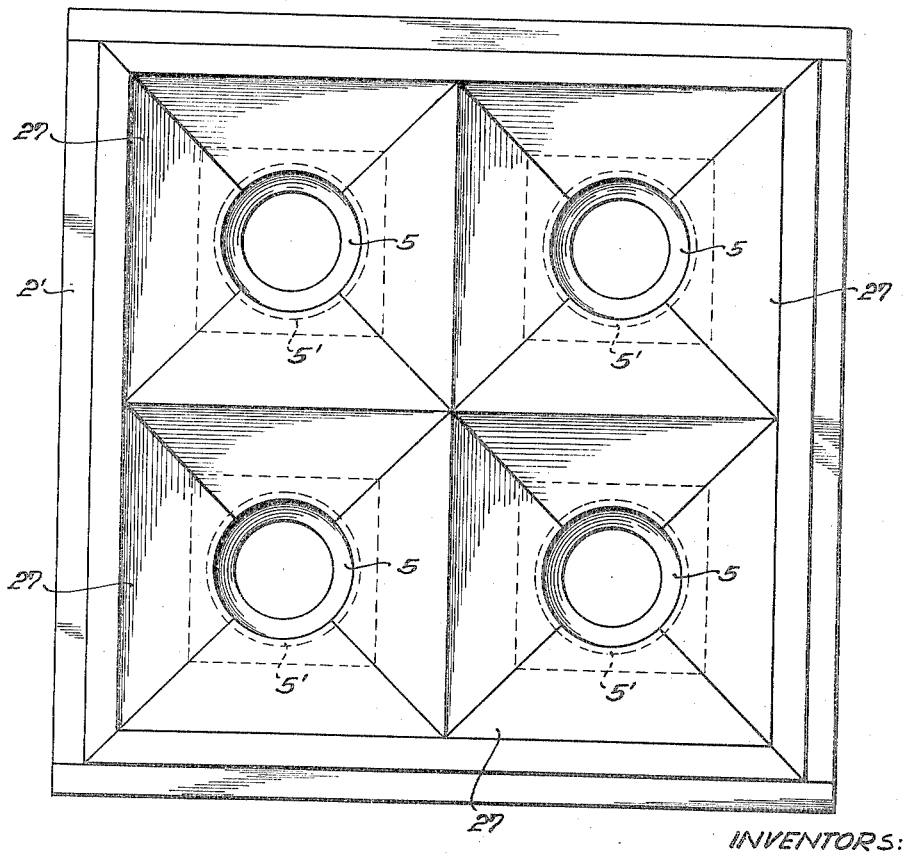

Sept. 18, 1956  H. HUISKEN ET AL  2,763,479
APPARATUS FOR SINTERING ORES AND THE LIKE
Filed March 22, 1955  14 Sheets-Sheet 11

INVENTORS:
Heinrich Huisken
and Paul Thomas
By: Michael S. Striker
agt.

Sept. 18, 1956  H. HUISKEN ET AL  2,763,479
APPARATUS FOR SINTERING ORES AND THE LIKE
Filed March 22, 1955  14 Sheets-Sheet 12

INVENTORS:
Heinrich Huisken
and Paul Thomas
By:
Michael S. Striker agt.

Sept. 18, 1956  H. HUISKEN ET AL  2,763,479
APPARATUS FOR SINTERING ORES AND THE LIKE
Filed March 22, 1955

INVENTORS:
Heinrich Huisken
and Paul Thomas
By:
Michael S. Striker
agt

INVENTORS:
Heinrich Huisken and
Paul Thomas
By:
Michael S. Striker agt.

United States Patent Office 2,763,479
Patented Sept. 18, 1956

2,763,479
APPARATUS FOR SINTERING ORES AND THE LIKE

Heinrich Huisken, Dusseldorf, and Paul Thomas, Oberhausen-Sterkrade, Germany, assignors to Gutehoffnungshutte Sterkrade Aktiengesellschaft, Oberhausen-Sterkrade, Germany Application March 22, 1955, Serial No. 495,996

21 Claims. (Cl. 266—20)

This invention relates to the art of sintering ores, concentrates and other pulverulent materials.

More particularly this invention relates to sintering apparatus of the type in which a plurality of independent sintering pans are utilized as distinguished from sintering apparatus of the continuous type. In other words, the present invention is related to sintering installations in which the contents of the sintering pans are sintered by the combustion of fuel mixed with the ore while the pans are stationarily supported.

The present invention has for a principal object therefore to provide an improved sintering pan installation which has large capacity and is of more economical construction in that the size and specific requirements of the installation and its components have been reduced while the output capacity has been increased.

It is a further object of this invention to provide a sintering installation including a plurality of independently movable sintering pans, a charging station, a discharging station, a plurality of sintering stations, means to move and manipulate the pans between the various stations and an improved exhausting means coordinated with each sintering station operable to facilitate sintering while preventing the escape of dust into the atmosphere.

It is a particular object of this invention to provide improved exhausting means for the sintering stations which subject the exhausting current of the medium drawn through the sintering pans to two stages of dust separation in order to more effectively prevent the escape of dust into the atmosphere.

It is a still more specific object of this invention to incorporate with each sintering station and the exhausting means associated therewith automatically operable control means for the current of exhausting medium to prevent an excess air condition at the sintering stations during the ignition period.

As a still further specific object, the automatically operable control means are condition responsive and operate to control the quantity of air exhausted at the sintering stations in dependence upon the presence or absence of the sintering pan at that station.

As a still more specific object, the invention provides a control for the quantity of air exhausted at the sintering station that is automatically operable by mobile ignition means operatively associated with the sintering stations.

It is a further object of this invention to provide an improved sintering pan construction of increased capacity.

It is an additional object to provide an improved mobile ignition means operatively associated with the sintering stations and operative to provide proper temperature conditions in the charge of each sintering pan in a more expeditious manner and with smaller fuel consumption.

Figure 1C:
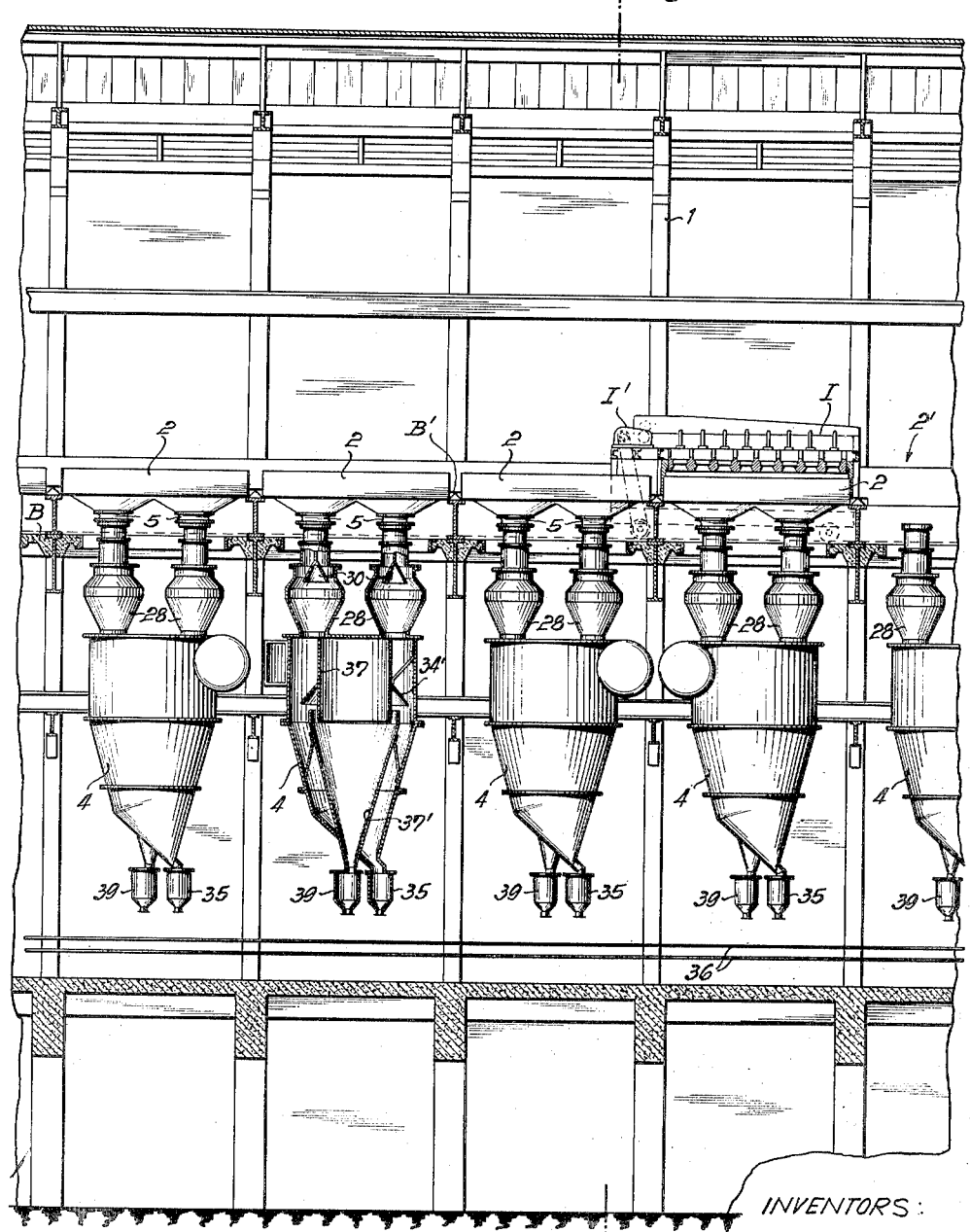
Figure 3:
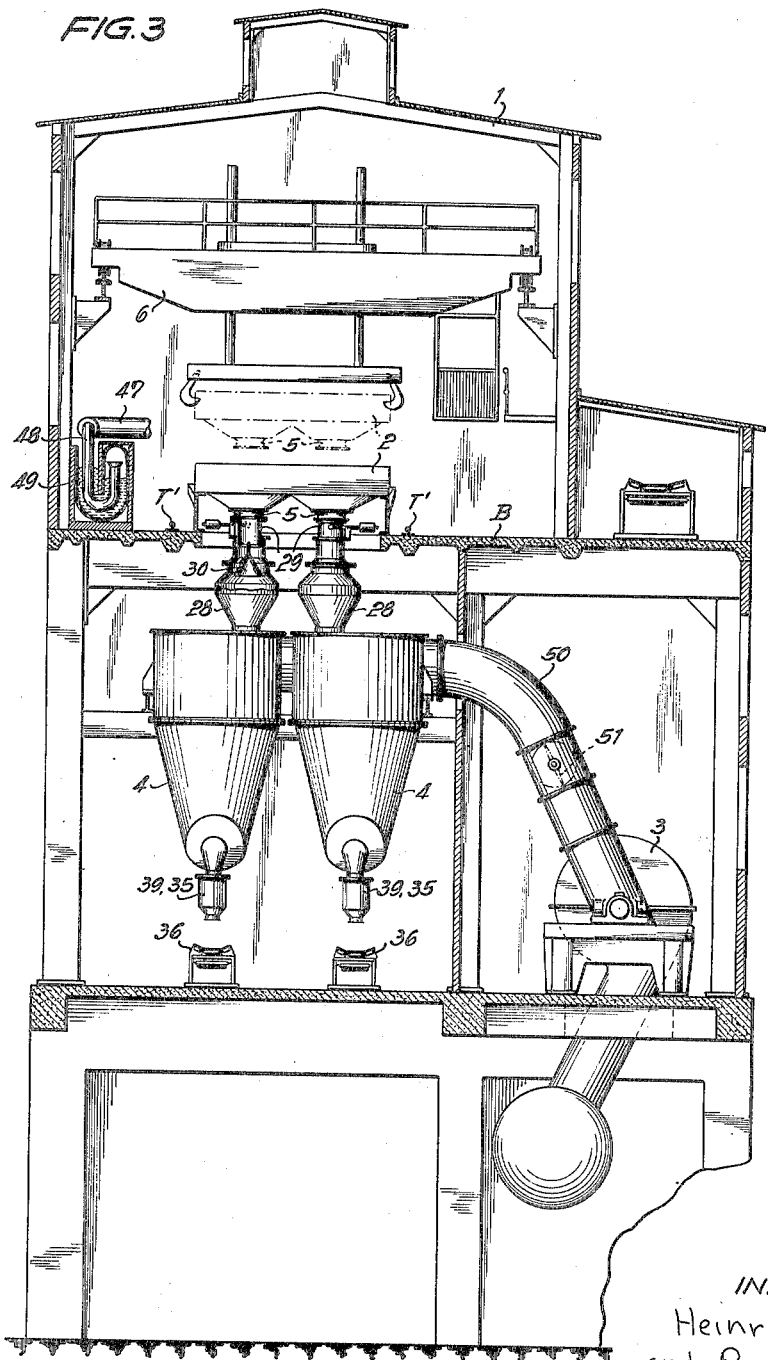
Figure 4:
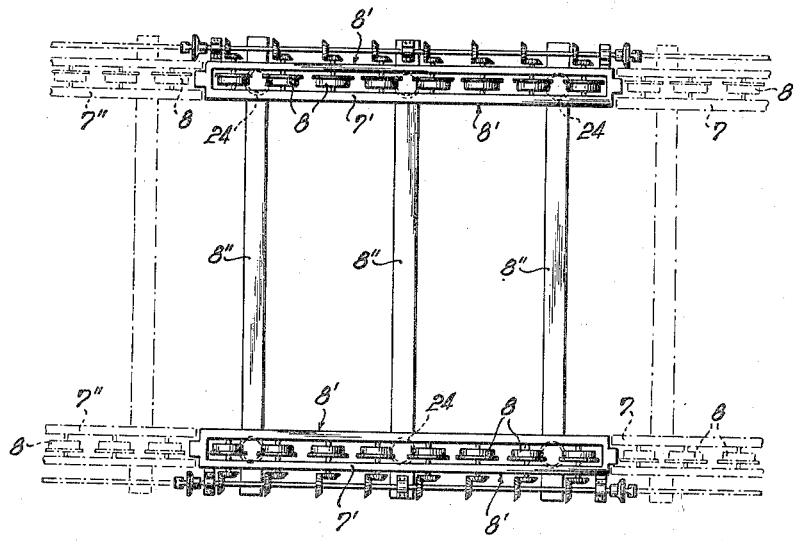
Figure 4A:
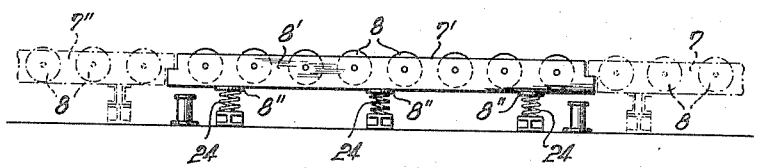
Figure 7:
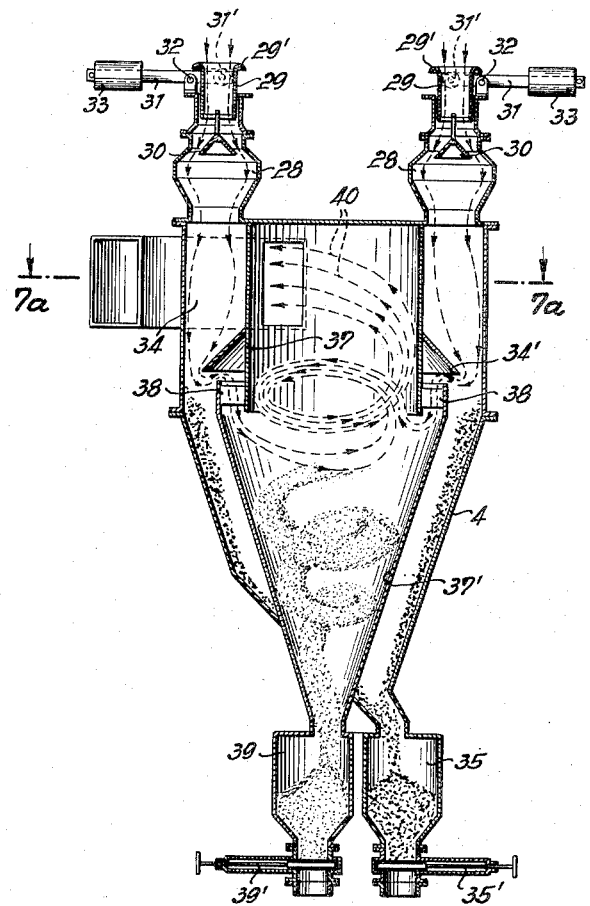
Figure 7A:
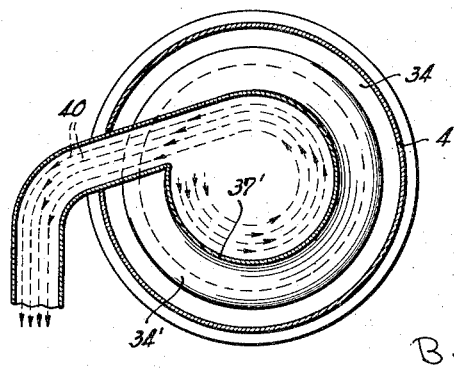
Figure 8:
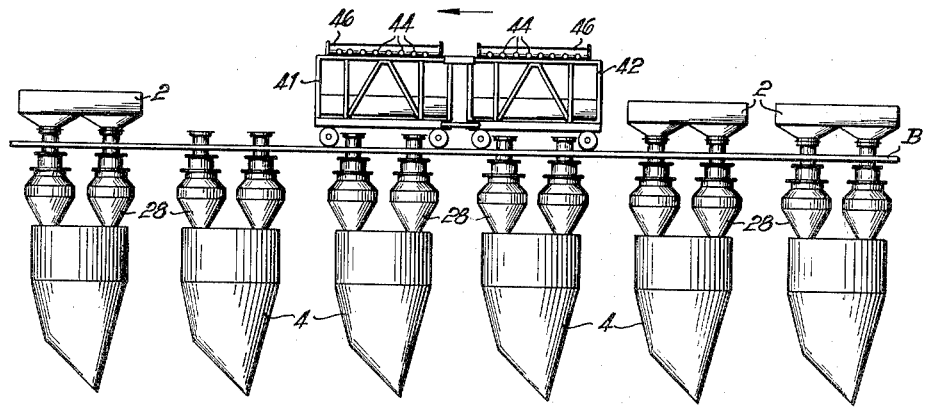
Figure 9:
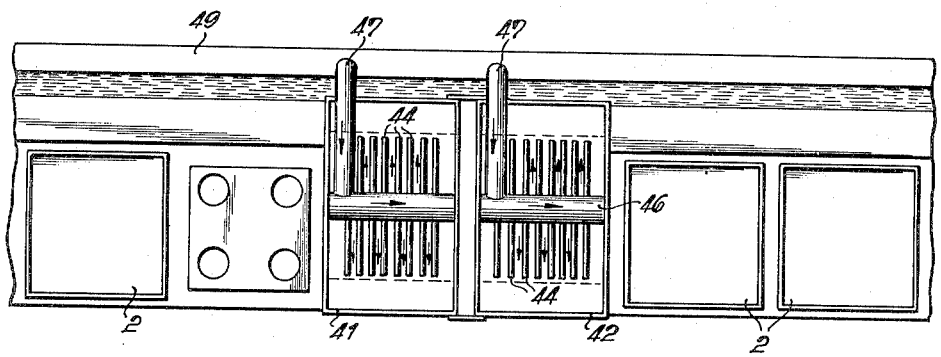
Figure 10:
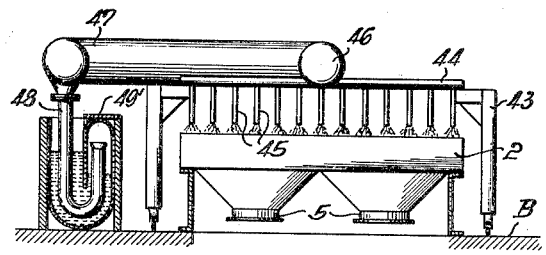
Figure 11:
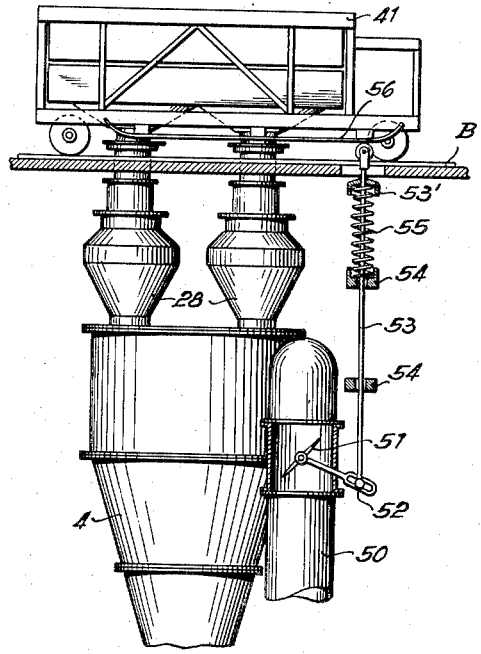
Figure 12:
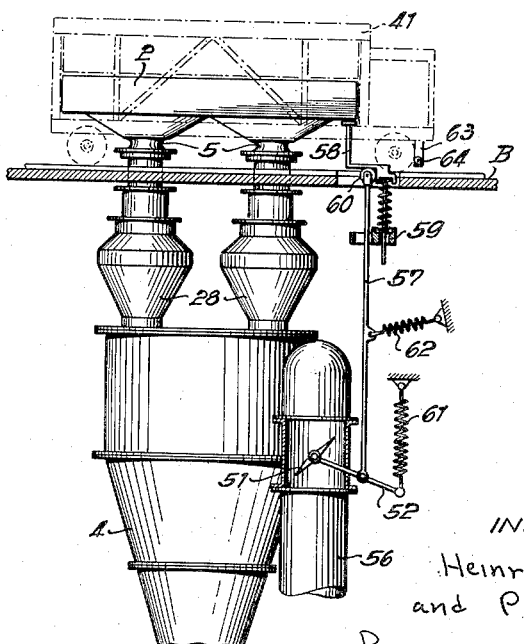
Figure 13:
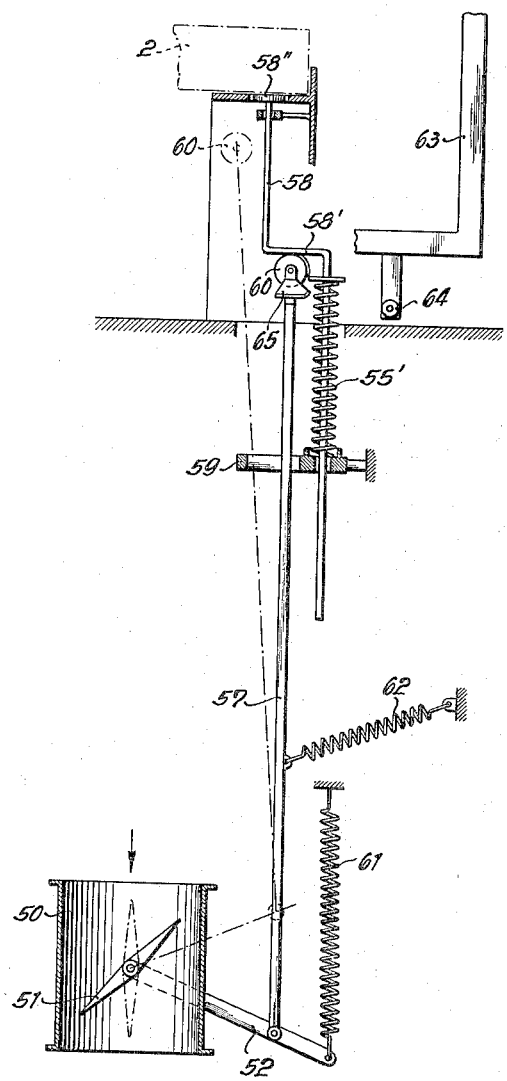
Figure 14:
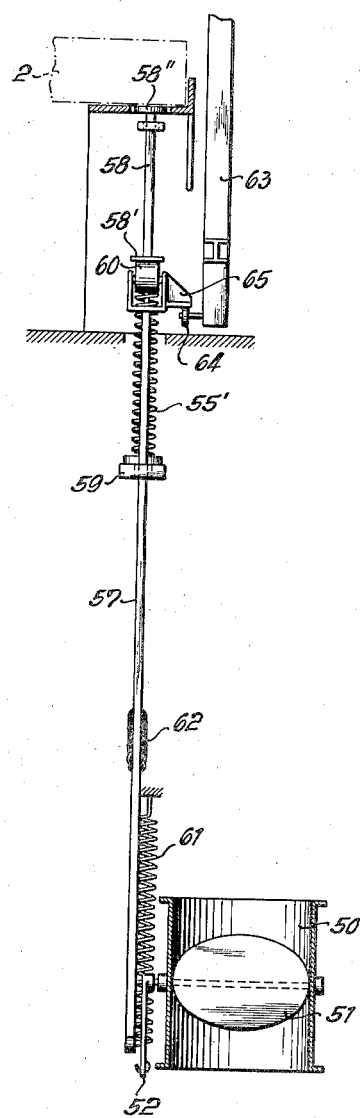

Further and more specific objects will be apparent from the following description taken in connection with the accompanying drawings, in which:

Figure 1, conveniently represented by separate views 1a, 1b, 1c and 1d, is a diagrammatic side elevational view of a sintering plant in accordance with the present invention with certain parts in section and others in elevation, Figure 2, represented by separate views 2a, 2b and 2c, is a diagrammatic plan view of the plan shown in Figure 1, Figure 3 is a cross sectional view taken along lines 3—3 of Figure 1c, Figure 4 is a diagrammatic top plan view of a portion of the section of the roller conveyor upon which the sintering pans are manipulated and handled during charging and discharging, Figure 4a is a side elevational view of the arrangement of Figure 4, Figure 5 is a sectional view on an enlarged scale through an improved sintering pan, Figure 6 is a top plan view of the sintering pan shown in Figure 5 with the grate supporting means removed, Figure 7 is a longitudinal sectional view on an enlarged scale and illustrating an improved dust separator, Figure 7a is a cross sectional view taken on lines 7a—7a of Figure 7, Figure 8 is a diagrammatic fragmentary side elevational view illustrating improved ignition means for the sintering stations in the form of a double ignition car, Figure 9 is a top plan view of the arrangement shown in Figure 8, Figure 10 is a front elevational view in the arrangement of Figure 8 with certain parts shown in cross section, Figure 11 is a diagrammatic fragmentary view illustrating one form of condition responsive control for the exhausting means, Figure 12 is a view similar to Figure 11 but illustrating the modified form of control for the exhausting means, Figure 13 is a fragmentary diagrammatic view partly in cross section illustrating the arrangement of Figure 12 on an enlarged scale, Figure 14 is a view taken at right angles of the structure shown in Figure 13.

In the drawings, the sintering pan installation includes a multi-floored building denoted generally at 1. The building includes a sintering station level B on which in the illustrated form are ten sintering stations arranged in a row. Each station includes a suitable framework B' square in form adapted to support a sintering pan 2. The sintering pans are of novel construction as will be pointed out hereinafter with reference to the description of Figures 5 and 6 and these pans include nipples on the bottom thereof for association with the exhausting means. The pans 2 during the sintering operation are filled with a mixture of ore to be sintered and fuel such as coke. The charge is introduced into each pan at a charging station noted generally at C following which the pan is conveyed to the particular sintering station, the charge ignited by mobile means and the ore heated to sintering temperature. The air for supporting the combustion during sintering is sucked through the charge in the pan which rests on a perforated grate. A plurality of suction blowers 3 furnish the draft and communicate with each pan by way of a pair of dust separating cyclones 4.

The structural arrangement embodied in Figure 1, as regards the general layout of the sintering plant is what can be termed an inline construction. The sintering stations are arranged in straight line form and above the same is an overhead trackway T upon which the traveling crane 6 moves. The pan carried by the crane 6 is deposited upon a roller trackway including plural sections that extend between the end sintering station and a discharging station denoted generally at D. Thus each pan after discharge, is conveyed beneath the charging station where it is filled with the grate covering layer and the sintering charge including ore and coke and thence moved into position to be picked up by the crane 6. The crane carries the now charged pan to the particular sintering station such as at 2'. When this pan is deposited by the crane the latter then can pick up another pan that has had its contents sintered and convey the same back to the rollerway for movement to the discharge station. The arrangement is such that while one pan is being discharged and charged the traveling crane can pick up another pan with its sintered charge and deposit it on a section of the rollerway so that as soon as the first mentioned pan has been recharged the latter can be conveyed to a sintering station. Ordinarily the plant operates successively in that each pan after the sintering process has been completed is lifted by the crane and manipulated to discharge in succession.

The discharge station D includes a tilting table 9 which includes means to clamp a pan thereto and live rollers thereon. A door 9' is suitably actuated to close the inlet opening to the discharge station after a pan has been run onto the tilting table, the discharge station being covered by a hood 9" and an exhausting means including a conduit 9''' communicates with the hood to withdraw dust therefrom that arises when the sintered charge is dumped upon the inversion of the tilting table. The sintered charge is deposited upon a grate 10 with which cooperates a crusher which comminutes the sinter cake. The comminuted pieces pass through an outlet 12 onto a conveying means 13 which is illustrated as a vibratory conveyor which conveys the comminuted material in the direction of the arrow 14 to a collector or a place of consumption. A sieve station 15 is incorporated in the conveying means which separates the sinter bed material and any unsintered or return material from the finish sinter. The return sinter material passes through a hopper down a conduit 15' to a conveyor belt 15" which forwards the separated return material and sinter bed material to bins or hoppers.

After the pan has been dumped, the tilting table is returned to its original position, the door 9' is opened and the rollerway on the tilting table propels the pan to track section 7. The now empty pan passes beneath the charging station to receive a new charge. At the charging station is a hopper 16 which distributes a grate covering layer consisting of pieces of sinter, ore or dry limestone. In order to uniformly deliver the grate covering layer into the now empty pan a delivery drum 17 is rotatably journaled at the bottom of the hopper. The moving pan passes beneath a hopper 18 which deposits the pan charge proper consisting of ore fines, additions, oil fuel and water. A mixing plant, not shown, supplies the various charge forming materials to a conveyor band 19 which delivers the same to a supply hopper 20. The charge passes through a loosening and comminuting drum 21 and thence into the divided hopper 18. Above the hopper 18 is a dividing band 22 which moves to and fro to uniformly discharge the mixed stock into the hopper 18 without unnecessarily disturbing the mixture. In order to uniformly distribute the charge into the moving pan, a delivery charging roller 23 is journaled in the bottom of hopper 18. Beneath rollerway section 7 is a connecting hopper C' which receives surplus charging material for delivery to suitable means that returns the same after any necessary separation to the mixing plant or the supply station. Thus an empty pan in moving from the discharge station across roller section 7 at a slow speed passes successively beneath hoppers 16 and 18 and receives its charge without having its forward movement interrupted. The now charged pan travels past roller section 7' to the end of roller section 7". Such a fully charged pan is illustrated at 2". The crane 6 deposits a pan with a sintered charge on roller section 7' and then picks up pan 2" and conveys it on a track T to the sintering station at 2'. The pan just deposited on track section 7' is moved to the discharge station, emptied, recharged and moved to the lifting off station on the track section 7". In this fashion continuous discharge and recharging of successive pans is effected with a minimum loss of time.

In view of the fact that a pan having a sintered charge therein is heavy, the track section 7' is resiliently mounted as shown in Figure 4. The driven rollers 8 are supported in suitable side frames 8' and these side frames in turn are connected by transverse members 8". To minimize shock impact on the rollers, rugged springs 24 are interposed between the floor level and the bottom of the transverse frame members 8". These springs are of such powerful construction that after a pan has been deposited thereon they raise the track section 7' so that the rollers 8 are level with the rollers of the adjacent section such as 7. This is important since it permits the transfer of the pan from section 7' to 7 without subjecting the same to shock. In lieu of the powerful springs 24, the invention further contemplates hydraulic or pneumatically operated pistons which are mounted subjacent the frame of the track section so as to cushion the impact occasioned when a loaded pan is deposited on the rollers and which operate to raise the track section to the level of the adjacent track sections. Thus the invention contemplates a vertically movable live rollerway track section subjacent an overhead craneway adapted to cushion the impact when a ladened pan is deposited thereon and which cushioning means restores the section to its original position with its rollers on a level with the rollers of the adjacent sections. The rollers are driven by line shafts mounted exteriorly of each side frame member and carrying axially spaced beveled gears. Each roller has a drive shaft having a beveled gear thereon meshing with a beveled gear on the line shaft. The line shaft is preferably sectioned and provided with a flexible coupling adjacent each end of the track section 7' to permit the up and down movement of this section relative to fixed sections 7 and 7". The latter rollerway section can have idle rolls therein and have a slight downward incline. However, roller sections 7 and 7' include driven rollers operable in opposite directions to convey the pans to and from the discharging station.

If desired, the vertically movable section 7' can have counterweights operatively associated therewith which normally urge the section to its uppermost position in alignment with the adjacent sections.

As a further feature the traveling crane 6 may have its raising and lowering mechanism so constructed that the lowering speed, when lowering a ladened pan, is automatically substantially diminished immediately prior to depositing the pan upon the track section 7' so that the shock absorbing effect of springs 24 is increased.

In order that the efficiency of the sintering plant may be increased, the sintering pans that are manipulated to and from the sintering stations 2 are of larger capacity than those heretofore in use. In prior known arrangements utilizing independently movable sintering pans, it is necessary that the suction effect through the charge pan be as uniform as possible throughout the entire base area of the pan. Such known arrangements utilized a single suction nipple or tube on the pan which had a base area of approximately $9m^2$. With such construction it is not possible to increase the base area of the pan and still incorporate the known forms wherein a single suction tube communicated with the pan. Contrary to expectation, it is not possible to obviate this drawback by merely increasing the diameter of the suction tube. This is because the suction tube diameter must be kept within certain limits in order to assure a proper seal between the pan nipple and the suction tube merely by depositing the pan with its nipple in contact with the suction tube.

The present invention provides independently movable sintering pans of increased base area and thus of increased capacity by incorporating a novel arrangement of plural suction nipples on the base of each pan. In accordance with the invention the suction nipples 5, Figures 5 and 6, are uniformly distributed throughout the base area of the pan whereby when they are in place and communicate with the exhausting means a uniform suction exists throughout the entire pan charge. With the present invention, the base area of a sintering pan is increased to 16m² with the resultant increase in capacity of the charge and in such fashion that the suction effect is uniform throughout the charge.

As shown in Figures 5 and 6, each pan 2 is square and includes a rigid frame. The pan includes grate bars 25 supported by supporting beams 26 in turn secured between opposite walls of the frame. As shown in Figure 5, the end grate bars 25 are also supported on the ledge on the other two opposite walls of the frame. The beams 26 are parallel to one another and spaced apart a distance corresponding to the length of the individual grate rod sections. Below the frame, below the side frame and thus below the grate, extends a suction cap 27. As shown, this suction cap is suitably formed into four equal sections each having downwardly and inwardly inclined walls. Each section terminates in an outlet opening to which is secured a suction nipple 5. As shown in Figure 6, the suction nipples 5 are distributed uniformly throughout the base area of the pan. Each suction nipple has a lower sealing flange 5' adapted to seat upon a suction tube of the exhausting means as set forth hereinafter. The four sections of the suction cap 27 all have the same wall inclination so that combustion-supporting air streams uniformly through the charge. Such a suction cap is economical to manufacture.

In order that the connection between the suction nipples 5 and the exhausting means is tight, the invention incorporates a movable flow control and connecting tube 29 which is movably mounted relative to the upper end of a connecting tube 28 and communicates with the interior of the cyclone separator 4. Suspended from the lower end of the movable tube 29 is a shut off bell 30. A lever arm 31 is pivoted in a bracket as at 32 on the flange of the upper portion of the tube means 28. The outer end of lever 31 has a weight 33 mounted thereon and the inner end of the lever carries a roller 31' which is engaged beneath a flange 29' on the top of the tube 29. The arrangement is such that when a pan 2 is lowered into position at a sintering station the flanges 5' on the nipples 5 engage the upper surface of the flanges 29' and force tube 29 to descend within the tube means 28 against the action of the counterweight 33. The counterweight 33 functions to maintain the flange in sealing engagement with the flanges 5' on the nipples. Thus when a pan with a ready sintered charge therein is lifted by the crane, the tube 29 together with the bell 30 is raised by the action of the weight so that the bell 30 functions to close communication through tube means 28 and thus interrupt the suction stream.

The invention thus provides a condition responsive valve controlling suction through the cyclones 4 in which the condition is the presence or absence of the sintering pans at the sintering stations so that when a freshly charged pan is lowered into position at the sintering station the bell valves 30 will open so that suction effect can occur through the charge in the pans, conversely when the pans are lifted the weighted levers raise the tubes 29 and thus bell valves 30 to shut off the suction passage.

As clearly indicated in Figures 1 and 7, the cyclones constitute dust separating means which embody a two-stage separation. The separating means include inner and outer chambers, the outer chamber 34 being in communication via tube means 28 with the sintering pans. The exhaust gas passing through tube means 28 and laden with dust from the sintering pans passes downwardly into the outer annular chamber 34. The gas stream flows past a downwardly and outwardly inclined deflector 34' which extends from the outer periphery of the wall 37 that defines the top of the inner chamber to a position radially spaced from the conical wall 37' that defines the lower portion of the inner chamber. The upper portion of the wall 37' is spaced from wall 37 so that the dust laden exhaust gas stream sweeps around the lower edge of the deflector 34' and thence flows into the space beneath the deflector and down into the inner chamber. When the gas stream changes its direction of motion to flow around the lower edge of the deflector 34', heavy dust particles will descend by gravity into the lower portion of the outer chamber 34 and thence into a collecting hopper 35. A valve means 35' is actuated from time to time to let the dust fall onto conveyor band 36 extending beneath the line of sintering stations and which delivers via a chute 36' and another conveyor 36" to the lower portion of the discharge tube 15', thence to the return conveyor 15", Figure 1. The exhaust gas thus prepurified enters the lower portion of the inner chamber after passing through vanes 38 which impart an helical motion to the gas. The inner chamber being a cyclone has a vortical whirl therein so that the gas rises while the dust descends against the walls 37' of the inner chamber to a collecting hopper 39. A valve means 39' controls the discharge from this hopper which also delivers to the conveyor means 36. The waste gas has now been purified from the fine dust particles and follows the direction of the arrows 40 to the blower 3.

The present invention associates two cyclones 4 with each sintering pan as shown in Figures 1, 2 and 3. Two nipples on one side of the median line of the pans communicate with one side of the cyclone while the other two nipples communicate with the other cyclone. If one attempted to utilize a single cyclone with four inlet openings, each for association with a nipple on a pan, it would be necessary to enlarge the diameter thereof to such an extent that the space between the adjoining sintering pans would be substantially increased, thus resulting in a much longer building. A cyclone with an enlarged diameter at its top would involve a structure of substantially increased height so that the structural height of the building would have to be increased. Therefore the present invention coordinates two cyclones transversely aligned beneath each sintering station so as to maintain the sintering stations in close proximity and reduce the height and length of the building. Therefore there is a substantial saving in building costs. Furthermore, replacement of any worn components of the dust separating means is simplified and a smaller cyclone has a higher dust removing efficiency than a large one.

Thus the invention coordinates a sintering pan of enlarged capacity having a depending bottom wall with four outlet nipples uniformly spaced therein with a pair of transversely aligned two-stage dust separating means each including a pair of valve controlled inlet channels communicating with the nipples of the pans. The arrangement is such that the diameter of the cyclones is less than the axial extent of the pan so that the row of pans occupies the minimum axial extent.

The invention further includes ignition means for igniting the charge in the pans. The fuel such as coke that is incorporated in the charge must first be ignited at the top surface of the charge. In Figure 1 there is illustrated an ignition car I which is incorporated with ignition burners and which receives blast furnace gas from the conduit means described hereinafter. The ignition car is a mobile car including the drive mechanism I' which propels the car back and forth along a track T', Figures 2 and 3.

In Figures 8–10 is illustrated the improved ignition car of the present invention. This improvement incorporates two cars 41 and 42 which are coupled together and driven along the track T' supported on the floor B of the plant. Each car has a base area corresponding to the size of an individual sintering pan. The car frame 43 carries a plurality of rows of transversely extending distributor tubes 44 from each of which depends a plurality of burner nozzles 45. The distributor tubes 44 are fed from an axially extending feed tube 46 which receives gas from a supply tube 47 extending transversely of the car and communicating with a depending U-shaped tube 48. The U-shaped tube 48 is movable in a water filled tub 49 that extends alongside the row of sintering stations. One half of this tub is covered at its top with an angular housing means 49' and at one end of this half and above the water level there is an inlet orifice for gas, that is blast furnace gas. Thus the ignition cars in their travel back and forth along the track T' are always connected to the gas supply while the water in the tub 49 acts as a water seal to prevent the escape of gas. Suitable supply connections, not shown, control the water level in the tub 49 and if desired a float mechanism of the known type can be incorporated with the supply and discharge connections for the tub to maintain proper water level therein.

It is clear that the flames emerging from the lower ends of the nozzles 45 will ignite the fuel embodied in the pan charge.

Since the operation of the blowers 3 will create suction through the pan charge, the invention incorporates means to control the suction. The quantity of air drawn through the charge that is necessary for sintering would result in a very large excess of air during the ignition period since the air requirements for ignition are only about a third of the quantity required for sintering. A high excess of air during ignition would lower the flame temperature so that the ignition period would be prolonged and the intensity of the ignition would be diminished.

According to the invention the suction effect through the sintering pan during the ignition period is throttled so that an air quantity appropriate for ignition is drawn through the charge and the excess air deficiency is avoided. This throttling results in a shorter ignition period and corresponding a reduction in the quantity of fuel consumed during ignition. The invention further provides means for controlling the throttling of the suction automatically for the duration of the ignition. An embodiment of such automatic control is illustrated in Figure 11. The cyclones 4 communicate with the blowers 3 via a conduit 50 and in this conduit is installed a pivotally mounted throttle valve 51. In Figure 11, the shaft for the throttle valve 51 has a control arm 52 connected thereto. Coupled with this control arm is a rod structure 53. The rod structure is movably mounted in spaced guides 54 and between the upper guide 54 and a suitable abutment 53' carried at the upper end of the rod is a spring 55 which normally urges the rod structure upwardly so that the lever arm 52 swings the throttle valve 51 to its fully open position. Thus in this form of the invention, so long as the ignition car has not yet reached its position over the respective pan, the valve 51 is fully open. As soon as the ignition car 41 reaches the pan so that the flames encounter the upper surface of the pan charge, the rod 53 is depressed by a control rail 56 carried on the underside of the car frame. This stresses spring 55 and lowers rod structure 53 so that the valve 51 is moved to the position illustrated in Figure 11 so that the suction through conduit 50 and thus through the pan charge is throttled. This throttled condition continues as long as the control rail 56 of the ignition car 41 is in contact with the roller on the upper end of the rod 53. As the ignition car starts to move past the particular sintering station, control rail 56 moves out of contact with the rod so that the spring raises the rod upwardly and restores the throttle valve to fully open position. Thus during sintering, after ignition, the required greater quantity of air is available.

In Figures 12–14 is illustrated a further modification of the control of the quantity of air in which the suction is throttled when a freshly charged sintering pan is lowered into position at a sintering station and after ignition the ignition car operates to restore the throttling valve to its fully open position. In Figures 12–14 the control rod structure is in two parts 57 and 58. Rod 57 is mounted for swinging movement on the lever arm 52 and is guided in its swinging movement toward and away from rod 58 by an eye 59. The upper end of the rod 57 carries a roller 60 which as shown in Figures 12 and 13 engages beneath an angular portion 58' of rod 58. A spring 61 connected to lever arm 52 exerts upward force on rod 57 to apply it against the angular portion 58' and a spring 62 is coupled to the rod 57 to assist in holding the roller 60 in position beneath the angular portion 58'. The springs 55' and 61 operate to normally hold the now associated rods 57 and 58 in an upward position when no pan is present at a sintering station. In this upper position the valve 51 is fully open. When a pan is lowered in place a portion thereof strikes the upper part 58'' of the rod 58 which is lowered against the force of spring 55'. The lowering action of rod 58 also pushes rod 57 downwardly to swing the valve 51 to the throttling position shown in Figures 12 and 13. Springs 62 maintain the roller 60 beneath the angular portion 58' of rod 58. In order to automatically open valve 51 and restore full suction after ignition has been completed, the ignition car has a depending arm 63 which carries a control roller 64. This control roller on the forward motion of the ignition car over the pan strikes a lug 65 connected to the bracket that supports roller 60 so as to swing rod 57 against the pulling force of spring 62. As soon as the roller passes beyond the edge of the angular portion 58', the spring 61 raises rod 57 to the dotted line position shown in Figure 13 to thereby swing pivot valve 51 to its dotted line position in that figure. Thus for the sintering process proper, full suction is re-established.

The immediately aforedescribed control device which automatically throttles suction during ignition constitutes mechanical regulating means. If desired, instead of the mechanical means of Figures 11–14, the control of the valve 51 can be effected indirectly utilizing a relay or a servo-motor. It is further to be understood that the indirectly acting control can be operated pneumatically, hydraulically or electrically. Thus, for instance the car 41 may likewise include a control rail 56 provided for engaging a switch which operates via relay means to actuate an electric servo-motor so that the same is operated to move the throttle valve 51 to its throttling position or its fully open position depending upon the movement of the car 41, it being clear that as the control rail 56 leaves the switch the latter changes the circuit comprising the electric servo-motor so that reverse movement of the servo-motor is effected. When this occurs, control valve 51 is restored to fully open position.

Thus the invention from a broad standpoint incorporates exhausting means at each sintering station which include operating means adapted to be placed in communication with the sintering pans and air current inducing means in communication with the separating means. The separating means include condition responsive inlet control valves operable to be open when a pan is associated with the separating means. Additional condition responsive valves are interposed between the separating means and the air current inducing means to throttle the air current for the duration of the ignition. In one form the lowering of the pan into position opens the inlet valves for the separating means and throttles the valves between the separating means and the air current inducing means. In the other form the throttling of the valves between the separating means and the air current inducing means is responsive to the passage of a mobile ignition means. However, in both arrangements the throttled condition exists for a temporary period during ignition.

A double length ignition means is highly advantageous because the charge of a particular sintering pan is first subjected to ignition during passage of the car 41 and then supplied with additional heat by the second car 42. Thus the upper layer of the charge in the pan is brought to a higher temperature. At the same time the higher temperature in the upper layer penetrates deeper into the charge. In this fashion, which in effect is a double ignition period, more favorable temperature conditions conducive to most efficient sintering are rapidly obtained with a smaller consumption of fuel in the charge. Thus the fuel quantity introduced into the pan charge is reduced. Therefore the cost of the sintering process is lowered because the gas which is fed to the ignition cars, for example blast furnace gas, is available as a by-product in large quantities and at low cost. Consequently the double ignition in the manner proposed by this invention not only accelerates the sintering process proper but is more economical since there is a saving of the costly fuel that goes into the charge, such as coke.

It is of course to be understood that the invention is not to be limited to two ignition cars coupled together as in Figures 8 and 9. The invention contemplates use of ignition means of a length double the axial extent of a pan so that this ignition means, when a mobile car is traveling across a pan, ignites the pan charge during the travel of the first half length of the car while the second half of the car length supplies the additional heat to the charge in the same manner as the car 42 in Figure 8. Further by the use of either two coupled ignition cars or a double length car, the process of sintering is accelerated in that the first half of the car length or car 41 after passing off of one sintering pan ignites the charge in the next pan while the second half of that car or the second car 42 is supplying additional heat to the first pan. Therefore a concept of providing a simultaneous ignition of one pan charge and supplying additional heat to the adjacent pan results in a substantial saving of time. The time saving factor increases with the size of the sintering plant, that is with the increasing number of sintering stations that are arranged in the row. If only a single car is utilized, that same car would have to be maintained over a single pan long enough to effect ignition and the additional time that is required to supply the additional heat quantity after ignition. Therefore such a plant could not operate in continuous fashion since the ignition means would have to be maintained stationary at each sintering station. In the present invention, the ignition and after-heat supply is effected continuously along the row of pans so that the sintering process is occurring continuously and the pans are being successively moved to be discharged, recharged and restored to a sintering station.

It is believed therefore that the sintering plant installation of the present invention provides substantial improvement in the art of sintering metal ores with particular reference to the economy of construction and operation. The sintering plant installation includes a plurality of independently portable sintering pans that can be associated with a row of sintering stations, a charging station at one end of the row and a discharging station preferably in alignment with the row. Means are provided for moving the pans to and from the respective stations so that a pan can be charged, sintered, moved to the discharge station, emptied, recharged and returned to a sintering station. The invention incorporates sintering pans of increased size in comparison with the known arrangements and improved eduction and dust separating means associated with each station including condition responsive flow control means. A mobile ignition means is mounted for movement relative to the row of sintering stations and is operable to throttle eduction through the sintering charge during the ignition period.

The invention preferably incorporates ignition means in the form of double length ignition means operable for continuous movement along the row of charged pans to successively ignite the charge in one pan and in continued movement ignite the charge in the next adjacent pan while supplying additional heat to the first pan.

The dust separating means associated with each station are two-stage separators so as to increase the quantity of dust separated from the exhausting medium resulting in the recovery of more sinter dust for return to supply and a more efficient purification of the exhausting medium.

What is claimed is:

1. In apparatus for sintering material, a plurality of portable sintering pans, a row of sintering stations, a discharge station spaced from the end sintering station of the row, a charging station between the discharge station and said end sintering station, transport means for moving the pans to and from the sintering stations, conveying means extending between the end sintering station and the discharge station for receiving the pans from the transport means and moving the pans to and from the discharge station, the pan in so moving passing the charging station, means at the discharge station for emptying sintered material from the pans, means at the charging station for charging an empty pan with material to be sintered, the pans when charged with material and transported to the sintering stations remaining stationary during sintering, mobile ignition means movable along the row of stations and passing above the pans for igniting the material therein, suction conduit means at each sintering station in communication with the associated pan, dust separating means at each station communicating with the suction conduit means, air current inducing means communicating with the dust separating means for drawing a current of combustion supporting air through the pans, and condition responsive suction flow control means operative to throttle suction during ignition and shut off suction when a pan is removed from a sintering station.

2. Apparatus for sintering material as claimed in claim 1, in which the flow control means includes separate movable valve means incorporated in the conduit means and between the separating means and the air current inducing means respectively.

3. Sintering apparatus as claimed in claim 1, in which each pan includes pairs of opposed side walls and a base, a grate means extending between the side walls above the base and a plurality of outlet nipples uniformly distributed throughout the area of the base and adapted for connection with the suction conduit means.

4. Sintering apparatus as claimed in claim 3, in which each pan is square and the base has four outlet nipples therein, the base including wall means subdividing the base into four sections of equal area each with a centrally disposed nipple, and the wall means in each section tapering downwardly and inwardly to the outlet nipples.

5. Sintering apparatus as claimed in claim 4, in which the degree of taper of the wall means in each section is the same.

6. Sintering apparatus as claimed in claim 1, in which each pan includes a rectangular base, a plurality of depending suction nipples uniformly distributed throughout the area of the base, and said separating means comprising a pair of cyclones aligned transversely of the row of sintering stations, said suction conduit means including a pair of inlet tubes for each cyclone, the respective pairs of tubes being aligned with one another in the direction parallel with the said row and lying on the sides of the axes of the cyclones that are respectively adjacent one another whereby the four inlet tubes are vertically aligned with the axes of the nipples so that the dust laden stream sucked out of each pan is distributed to two cyclones.

7. Sintering apparatus as claimed in claim 1, in which the condition responsive suction flow control means includes movable valve means between the separating means and the air current inducing means, and actuating means operatively coupled to the valve means and operable responsive to the passage of the mobile ignition means above a charged pan at a station to throttle the flow from the separating means during the ignition period.

8. Sintering apparatus as claimed in claim 1, in which the suction flow control means includes movable valve means and actuating means for the valve means including means for throttling the suction when a pan is placed in position at a station and means responsive to the passage of the mobile ignition means for restoring full suction when the ignition period is completed.

9. Sintering apparatus as claimed in claim 1, in which the ignition means includes means for supplying a flame above each pan for a period longer than that required for ignition of the top layer of the charge so as to supply additional heat to the charge to intensify ignition thereof and accelerate the temperature rise therein to the value required for most favorable sintering.

10. Sintering apparatus as claimed in claim 1, in which the mobile ignition means includes frame means, burner means distributed throughout the frame means in the direction of travel thereof for a distance in excess of the corresponding dimensions of a pan so that during travel of the burners over a pan some of the same are supplying heat to the charge when the foremost burners, as regards the direction of movement, have passed beyond the pan.

11. Sintering apparatus as claimed in claim 10 in which the sintering stations are in close juxtaposition, said burner means being distributed throughout a distance approximately twice the size of a pan whereby the foremost burners after passing beyond one pan supply ignition flame to the next succeeding pan while the said one pan is receiving additional heat from the other burners.

12. Sintering apparatus as claimed in claim 11 and including means for continuously supplying gaseous fuel to the burners during the travel of the ignition means along the row.

13. Sintering apparatus as claimed in claim 1, in which the mobile ignition means includes two vehicular frames, means coupling the frames together, and burner means distributed throughout each frame means in the direction of travel thereof for a distance at least corresponding to the corresponding dimensions of a pan.

14. Sintering apparatus as claimed in claim 13 and including means for continuously supplying the burner means on each frame with gaseous fuel during the travel of the frames along the row.

15. Sintering apparatus as claimed in claim 1, in which the transport means includes a raising and lowering means mounted for movement above and parallel to the row, the means for receiving pans from the transport means and for moving the pans to and from the discharge station comprises a roller way, said roller way including a receiving section onto which the pans are lowered and means mounting the receiving section for vertical movement including resilient supporting means operative to permit downward movement of the section to cushion the impact occasioned when a pan is lowered onto said section and to elevate the said section and the pan thereon back to its original level.

16. Sintering apparatus as claimed in claim 15, in which the raising and lowering means includes means operative to decrease the speed of lowering of a pan prior to depositing the same upon said receiving section so that the impact from depositing a pan thereon is substantially minimized.

17. In sintering apparatus of the successive batch type wherein a plurality of independently portable sintering pans is manipulated between a charging station, a sintering position where the pans are stationary during sintering and a discharge station where the pans are emptied, the improvement comprising the combination including supporting means at the sintering position adapted to support a sintering pan, a sintering pan structure comprising side walls, a grate and an apertured base, said base having a plurality of dependent outlet nipples uniformly distributed throughout the area thereof and eduction means at the sintering position including a plurality of independent tube means each cooperable with a nipple.

18. Sintering apparatus as claimed in claim 17, in which the base structure of the pan is sub-divided into four sections, each section tapering downwardly and inwardly to an outlet nipple.

19. Sintering apparatus as claimed in claim 18, in which the degree of taper is uniform in each section.

20. Sintering apparatus as claimed in claim 17, in which the eduction means further include a pair of separating means, each of the pair incorporating two inlet tube means, the base of the pan having four outlet nipples and flow control means incorporated with the eduction means.

21. Sintering apparatus as claimed in claim 17, in which the eduction means include flow control means operable to throttle suction through the pan, actuating means for the flow control means, movable ignition means supported for movement over a pan at the sintering position and the actuating means for the flow control means including means responsive to the passage of the ignition means operable to assure a throttled suction during ignition and restore full suction thereafter.

No references cited.